(12) United States Patent
Pampu et al.

(10) Patent No.: US 8,787,318 B2
(45) Date of Patent: Jul. 22, 2014

(54) SYSTEM AND METHOD FOR MANAGING AN ACCESS NETWORK RE-SELECTION

(75) Inventors: Cornel Pampu, Berlin (DE); Zhou Qing, Berlin (DE); Marius Corici, Berlin (DE); Alberto Diez, Berlin (DE); Thomas Magedanz, Berlin (DE); Dragos Vingarzan, Berlin (DE)

(73) Assignees: Huawei Technologies Co., Ltd., Shenzhen (CN); Fraunhofer-Gesellschaft zur Forderung der Angewandten Forschung E.V., Munuch (DE)

( * ) Notice: Subject to any disclaimer, the term of this patent is extended or adjusted under 35 U.S.C. 154(b) by 0 days.

(21) Appl. No.: 13/566,628

(22) Filed: Aug. 3, 2012

(65) Prior Publication Data
US 2013/0064221 A1    Mar. 14, 2013

Related U.S. Application Data

(63) Continuation of application No. PCT/CN2010/070495, filed on Feb. 3, 2010.

(51) Int. Cl.
*H04W 4/00*  (2009.01)
*H04W 36/00* (2009.01)

(52) U.S. Cl.
USPC ............................. 370/331; 455/436

(58) Field of Classification Search
CPC combination set(s) only.
See application file for complete search history.

(56) References Cited

U.S. PATENT DOCUMENTS

| | | | |
|---|---|---|---|
| 6,577,868 B1 | 6/2003 | Vialen et al. | |
| 7,072,656 B2 * | 7/2006 | Willars et al. | 455/436 |
| 7,697,934 B2 * | 4/2010 | Vikberg et al. | 455/435.2 |
| 8,538,433 B2 * | 9/2013 | Kekki et al. | 455/436 |
| 2003/0212764 A1 | 11/2003 | Trossen et al. | |
| 2004/0018841 A1 | 1/2004 | Trossen | |
| 2004/0063430 A1 * | 4/2004 | Cave et al. | 455/436 |
| 2007/0298800 A1 * | 12/2007 | Williams et al. | 455/436 |
| 2008/0045262 A1 | 2/2008 | Phan et al. | |
| 2008/0064401 A1 * | 3/2008 | Forssell et al. | 455/436 |

(Continued)

FOREIGN PATENT DOCUMENTS

| | | |
|---|---|---|
| CN | 101001460 | 7/2007 |
| CN | 101411115 | 4/2009 |

(Continued)

OTHER PUBLICATIONS

International Search Report mailed Nov. 4, 2010 in corresponding International Patent Application No. PCT/CN2010/070495.

(Continued)

*Primary Examiner* — Clemence Han
(74) *Attorney, Agent, or Firm* — Staas & Halsey LLP

(57) ABSTRACT

A system and method is provided for managing an access network re-selection. The system includes computing hardware configured to provide a first indication indicating a target access network to be re-selected in case of a handover event and a second indication for establishing a certain context on a target access network. Further, computing hardware may be configured to establish the certain context on the target access network dependent on the provided second indication, said established context including a first part of the access network re-selection. And computing hardware may be configured to execute a second part of the access network re-selection due to the provided first indication and a received trigger for the handover event.

15 Claims, 5 Drawing Sheets

(56) References Cited

U.S. PATENT DOCUMENTS

| | | | | |
|---|---|---|---|---|
| 2009/0042576 | A1* | 2/2009 | Mukherjee et al. | 455/436 |
| 2010/0003980 | A1* | 1/2010 | Rune et al. | 455/436 |
| 2011/0269467 | A1* | 11/2011 | Leclerc et al. | 455/436 |
| 2012/0276904 | A1* | 11/2012 | Bachmann et al. | 455/436 |

FOREIGN PATENT DOCUMENTS

| | | |
|---|---|---|
| CN | 101568162 | 10/2009 |
| CN | 101577949 | 11/2009 |
| EP | 1675424 | 6/2006 |
| EP | 2034790 | 3/2009 |

OTHER PUBLICATIONS

Kenichi Taniuchi et al., "IEEE 802.21: Media Independent Handover: Features, Applicability, and Realization", IEEE Standards in Communications and Networking, Jan. 2009, pp. 112-120.

Written Opinion of the International Searching Authority mailed Nov. 4, 2010 in corresponding International Patent Application No. PCT/CN2010/070495.

International Search Report of Corresponding PCT Application PCT/CN2010/070495 mailed Nov. 4, 2010.

Extended European Search Report issued Feb. 1, 2013, in corresponding European Patent Application No. 10845018.0.

* cited by examiner

SYSTEM AND METHOD FOR MANAGING AN ACCESS NETWORK RE-SELECTION

CROSS-REFERENCE TO RELATED APPLICATION

This application is a continuation of International Application No. PCT/CN2010/070495, filed on Feb. 3, 2010, entitled "System and method for managing an access network re-selection", which is hereby incorporated herein by reference.

BACKGROUND

The present disclosure relates to communicating over access networks or access communication networks.

The current state of the art considers separately the handover procedures from the session establishment procedures, for example in $3^{rd}$ Generation Partnership Project (3GPP) and Internet Engineering Task Force (IETF).

In particular, the current state of the art considers separately the problems of network based network discovery and selection and handover optimizations, e.g. 3GPP, and IETF.

Related to handover, the following two conceptual mechanisms for handover are defined for the network based network discovery and selection: First, the network discovery and selection decision is made independent on the triggering or of the handover operation. Second, the network discovery and selection decision is made highly triggered by the trigger or of the handover operation.

In the first case, the network makes the network discovery and selection decision and transmits the information to the mobile device dependent on other external parameters. When a handover is triggered by the mobile device due to various external factors, the handover operation is executed. This presumes that no proactive procedure is executed on the target access network before the handover trigger.

In certain scenarios, the network entity making the network selection decision is aware with a very high probability of the access network to which the handover will be executed, not at the moment of the handover trigger because this is dependent on the mobile device. In these cases, the network selection can be followed by an indication to the target access network in order to prepare for a future handover. Because of this preparation, the time critical execution of the handover may be minimized.

In the second case, the network makes the network discovery and selection decision and transmits it to the mobile device only after the handover is triggered by the mobile device. In this case, all the procedures related to the handover are executed after the handover trigger, namely after the network receives the network discovery and selection request from the mobile device which is after the handover was triggered.

Even though the handover trigger may be proactive, e.g. based on a rapid decrease of signal strength, all the procedures related to the handover are executed after the event happens.

For both cases, only after the event that an imminent handover is available at the mobile device, the procedures for the handover are executed, e.g. in the 3GPP specification the procedures for a handover contain a preparation phase and a handover execution phase. The procedures for the handover have to be faster than the loss of connectivity to the source access network. Otherwise, there is an interruption in service due to the handover.

For example, in the 3GPP Evolved Packet Core (EPC) architecture, the problem may be presented as following. The Access Network Discovery and Selection Function (ANDSF) transmits the new network discovery and selection information to the mobile device depending on various factors independent whether a handover event is available at the mobile device. Even though the ANDSF is aware that one or more of the access networks are highly probable to be selected by the mobile device in the near future and that a handover procedure may be executed, no indication is transmitted to any other network entity in order to prepare this future handover. When the handover event happens at the mobile device, it executes the handover procedures without having any proactive procedure executed. Therefore, it executes all the re-selection procedures, preparation phases and handover execution phases after the handover trigger. If the attachment to the target access network takes a long period of time, e.g. because of 3GPP accesses—UTRAN, GERAN, E-UTRAN, and the connectivity to the source access network may be fast lost (e.g. WiFi accesses), then a reduction of the duration of the procedures executed after the handover trigger may be to be considered.

For example, in the IEEE 802.21 Media Independent Handover (MIH) architecture, two types of operations are defined. For the first, the handover is controlled by the mobile device while in the second it is controlled by the network. In the mobile device controlled scenario, the mobile device detects the handover event. Then, the mobile device requests the network discovery and selection information from the network. In this case, all the handover related procedures are executed after the handover trigger, even if they contain some proactive procedures over the target access network.

In the network controlled handover, the network MIHF executes some proactive procedures. Only afterwards, it transmits a handover command to the mobile device. In this case, the handover decision is not made by the mobile device and the handover trigger is received from the network. Thus, the procedure of executing the proactive operations and the handover procedure are tightly coupled. The handover has to be and is executed immediately after receiving of the information from the network. As a result, it is not based on event triggers which may be received only by the mobile device, e.g. Link Down or Link Going Down.

Therefore, neither the 3GPP nor the MIH consider that any procedure may be executed on the target access network prior to the handover trigger which may be an active or proactive trigger remaining that all the preparation procedures on the target access network and the handover execution procedure to be executed after this trigger.

SUMMARY OF THE INVENTION

A goal to be achieved by the present disclosure is to reduce the procedures for the handover, in particular by considering a new type of proactive procedures, which are executed prior to the handover trigger and which reduce the time necessary for the execution of the procedures after the handover trigger.

According to a first aspect, a system for managing an access network re-selection is suggested. The system comprises providing means, establishing means and executing means. Said providing means may be configured to provide a first indication indicating a target access network to be re-selected in case of a handover event and a second indication for establishing a certain context on the target access network. Further, said establishing means may be configured to establish the certain context on the target access network dependent on the provided second indication, said established context including a first part of the access network re-selection. Said executing means may be configured to execute a second part of the access network re-selection due to the provided first indication and the received handover trigger triggering said handover event.

The present system manages or provides a handover of a user entity, like user equipment or a mobile device, between at least two access networks of a communication network.

Said first indication may be embodied as a network decision indication. The network decision indication may include network re-selection policies that the executing means have to execute when a handover event happens.

Said second indication may be a network re-selection indication. Said network re-selection indication may be configured to establish a context, above-mentioned certain context, in a selected target access network, said context containing at least one procedure part of the re-selection procedure being executable without a communication with the user entity. In particular, the network re-selection indication may include the identity of the user entity. In particular, said user entity may comprise said executing means.

Said providing means may be embodied as a Network-Network Re-Selection Decision Function (N-NRDF). Said N-NRDF may be configured to decide on an access network re-selection. Further, said N-NRDF may be located in a network entity of the communication network, e.g. ANDSF of the 3GPP Evolved Packet Core, or may be located in the user entity.

Moreover, said establishing means may be embodied as a Network-Network Re-Selection Enforcement Function (N-NREF). As indicated above, said N-NREF may be adapted to establish the certain context on the target access network. Additionally, said N-NREF may be configured to execute the handover procedures after the reception of the handover trigger.

Furthermore, said executing means may comprise two entities, namely a Mobile Node-Network Re-Selection Decision Function (MN-NRDF) and a Mobile Node-Network Re-Selection Enforcement Function (MN-REF). Said MN-NRDF may be configured to execute an access network re-selection due to the provided network decision indication and the handover trigger triggering said handover event.

Further, said MN-REF may be configured to execute the re-selection taking into account the decision of said MN-NRDF.

Said system may be an arrangement of at least two entities distributed in the communication network. Said at least two entities may include said providing means, said establishing means and said executing means.

Further, said context may be embodied as a volatile-shallow context. Said volatile-shallow context may be a reduced context embodying a proactive phase prior to the handover trigger. In this regard, the introduction of a new reference point between the entity and the access network is considered that makes the decision from the network side to which access network the user entity may attach in case of a handover event. Said new reference point may transmit an indication, in particular the network re-selection indication, to the correspondent access network in order to establish the volatile-shallow context.

Said indication, in particular the network re-selection indication for the establishment of the volatile-shallow context in the target access network, may be transmitted when the information which access network may be re-selected is sent to the user entity, e.g. a mobile device. The volatile-shallow context may be created due to the first information transmitted to the user entity, independent of the moment of the handover event which is received in the user entity. In particular, the procedural steps for the establishment of the volatile-shallow context are part of the steps which are executed during the handover procedure to the target access network, steps which do not have to be executed any more during the preparation of the execution phase after the handover trigger is received at the user entity.

Further, the target access network may be the access network the execution means, e.g. the MN-NRDF, may decide to re-select in case a handover event happens.

The handover trigger may be a trigger triggering the handover and may be generated externally to the user entity.

The respective means may be implemented in hardware or in software. If said means are implemented in hardware, it may be embodied as a device, e.g. as a computer or as a processor, or as a part of a system, e.g. a computer system. If said means are implemented in software, it may be embodied as a computer program product, as a function, as a routine, as a program code or as an executable object.

The respective user entity may be embodied as a mobile device or mobile terminal, in particular as a smart phone.

According to an implementation form, the first indication may be embodied as a network decision indication including network re-selection policies that the execution means have to execute in case of the handover event of a user entity from a current access network to the target access network. In particular, said certain context may be embodied as a volatile-shallow context, said volatile shallow context including information on an identity of the user entity, in particular user equipment or a mobile device.

According to an implementation form, said certain context may be embodied as a volatile-shallow context, wherein said volatile-shallow context may include information on the target access network for enabling a fast authentication of the user entity after the handover event. This information may be included in the second indication and/or may be augmented by other internal network procedures.

According to an implementation form, said certain context may be embodied as a volatile-shallow context, wherein said volatile-shallow context may include information on active data flows or possible active data flows after the handover of the user entity for enabling a faster policy-based resource reservation for the user entity after the handover event. This information may be received in the first indication and/or may be augmented by different internal network procedures.

According to an implementation form, said volatile-shallow context may include information on a physical layer and/or a link layer and/or network layer for a following communication with the user entity. This information may be partially received in the indication from the MN-NRDF and/or may be augmented by different internal network procedures.

According to an implementation form, said volatile-shallow context may include information on a mobility model to be used after the reception of the handover trigger. This information may be received in the indication from the N-NRDF and/or may be augmented by further different internal network procedures.

According to an implementation form, during the volatile-shallow context establishment, said establishing means, in particular said N-NREF, may be located in a gateway, e.g. an ePDG in EPC, or in management entities of different access network technologies, e.g. MME in the EPC.

According to an implementation form, said establishing means may be configured to initiate pre-authentication procedures dependent on the second indication provided by said providing means. In particular, said second indication may be received from the N-NRDF, i.e. based on the identity of the user entity.

According to an implementation form, said establishing means may be configured to initiate procedures for establishing a communication path through the target access network at least dependent on said second indication provided by the providing means. In particular, the N-NREF may initiate procedures for establishing the communication path through the target access network, e.g. discovering of the PDN GW, based on the information already available.

According to an implementation form, said establishing means may be adapted to initiate mobility related procedures for exchanging mobility related information to the certain other network entities. In particular, said establishing means may be configured to initiate the mobility related procedures for preparing a new communication path on the target access network. In particular, said procedures may be adapted for Proxy Binding Update and Proxy Binding Acknowledgement Exchange. Further, e.g. in PMIP, the MAG tunnel end may be activated, the LMA tunnel end information may be stored as a secondary option in case the tunnel over the source access network may be deactivated.

According to an implementation form, during the volatile-shallow context establishment, said establishing means may be configured to initiate policy and charging rules for bringing information on Quality of Service (QoS) rules to be enforced by said establishing means. In particular, the N-NRF may initiate the policy and charging rules which bring the information on the QoS rules to be enforced to the N-NREF, e.g. Gateway Control Session and PCEF initiated IP-CAN session modification procedure.

According to an implementation form, said first part of the access network re-selection executed by said established context in the target access network may be executable without any communication with the executing means, which is particularly part of the user entity.

Said first part of the access network re-selection executed by said established context and the second part of the access network re-selection executed by said executed means may form the whole access network re-selection or whole access network re-selection procedure.

According to another aspect, the present disclosure relates to a method for managing an access network re-selection. The method may comprise providing a first indication indicating a target access network to be re-selecting in case of a handover event and a second indication for establishing a certain context on the target access network. The method may further comprise a step of establishing the certain context on the target access network dependent on the provided second indication, said established context containing a first part of the access network re-selection. Moreover, the method may comprise a step of executing a second part of the access network re-selection due to the provided first indication and the received handover trigger.

According to another aspect, the present disclosure relates to a computer program comprising a program code for executing the method for providing a user entity-based service in a communication network when run in a computer.

BRIEF DESCRIPTION OF THE DRAWINGS

Further embodiments of the present disclosure will be described with respect to the following figures, in which.

DETAILED DESCRIPTION OF EMBODIMENTS OF THE INVENTION

Figure 1:
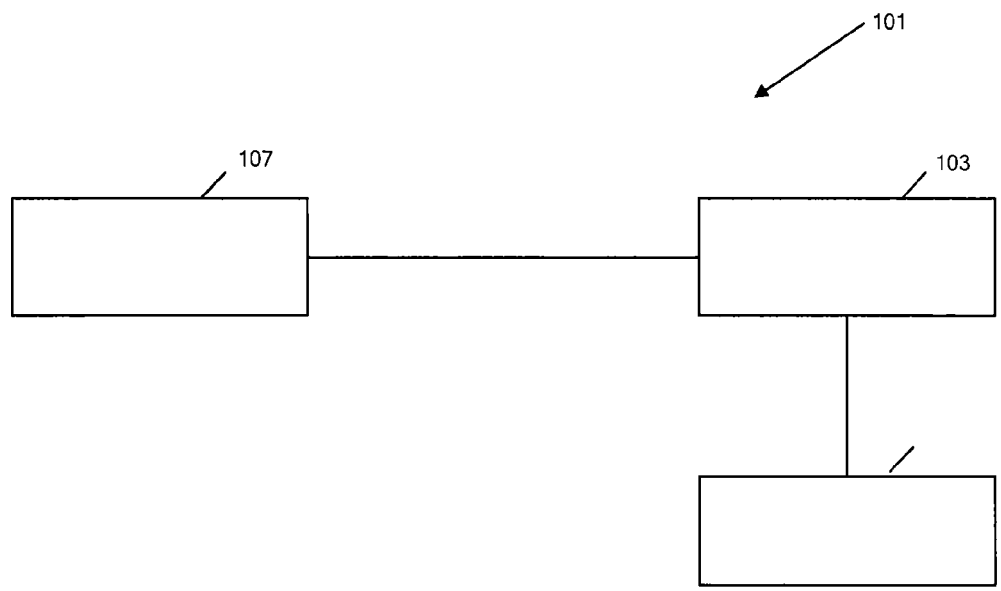
FIG. 1 shows a first embodiment of a system for managing an access network re-selection.

In FIG. 1, a first embodiment of a system 101 for managing an access network re-selection is illustrated.

The system 101 of FIG. 1 has providing means 103, establishing means 105 and executing means 107.

Said providing means 103 are configured to provide a first indication indicating a target access network to be re-selected in case of a handover event. Further, said providing means 103 are configured to provide a second indication for establishing a certain context on the target access network.

Moreover, said establishing means 105, 305 are configured to establish the certain context on a target access network dependent on the provided second indication. Said established context may contain a first part of the access network re-selection.

Said executing means 107 are configured to execute a second part of the access network re-selection due to the provided first indication and a received handover trigger.

Figure 2:
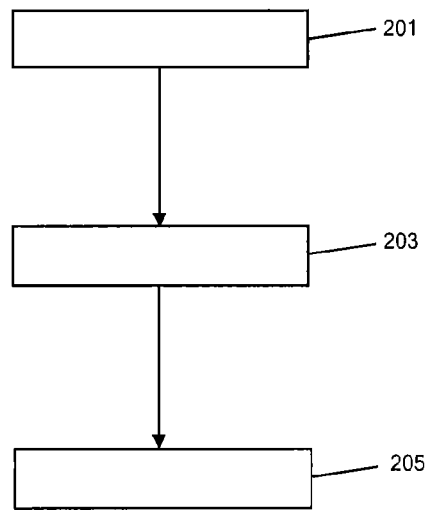
FIG. 2 shows an embodiment of a method for managing an access network re-selection.

In FIG. 2, an embodiment of the method for managing an access network re-selection is depicted.

As shown in FIG. 2, the method comprises a step of providing 201 a first indication indicating a target access network to be re-selected in case of a handover event and a second indication for establishing a certain context on the target access network.

Furthermore, the method has a step of establishing 203 the certain context on the target access network dependent on the provided second indication. In particular, said established context may contain a first part of the access network re-selection.

Moreover, the method has a step of executing 205 a second part of the access network re-selection due to the provided first indication and a received handover trigger.

Figure 3:
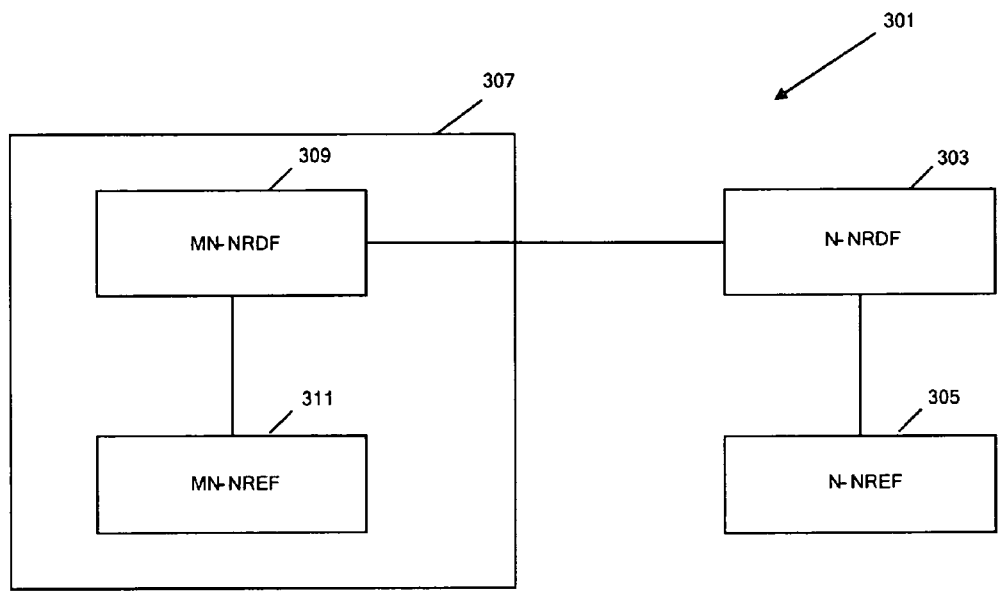
FIG. 3 shows a second embodiment of a system for managing an access network re-selection.

FIG. 3 shows a second embodiment of a system 301 for managing an access network re-selection.

The system 301 of FIG. 3 is based on the system 101 of FIG. 1 and has providing means 303, establishing means 305 and executing means 307.

Said providing means 303, said establishing means 305 and said executing means 307 may or may not be located at the same physical element.

Further, said providing means 303 may have a Network-Network Re-Selection Decision Function (N-NRDF). Said N-NRDF 303 may make decisions on access network re-selection. This function may be located in the network, e.g. ANDSF of the 3GPP Evolved Packet Core, or may be located in the mobile device.

Furthermore, said establishing means 305 may have a Network-Network Re-Selection Enforcement Function (N-NREF). Said N-NREF 305 may execute the procedure of establishment of the volatile-shallow context as indicated by the N-NRDF 303. Also, said N-NREF 305 may execute the handover procedures after the handover trigger, e.g. the target access network entities.

Moreover, said executing means 307 may have a Mobile Node-Network Re-selection Decision Function (MN-NRDF) 309 and a Mobile Node—Network Reselection Enforcement Function (MN-NREF) 311.

Said MN-NRDF 309 may make the decision on the access network re-selection due to triggers that are available only at the mobile device. This function may be located in the mobile device, e.g. the part of the mobile device which decides based on the handover trigger when an access network has to be selected.

Said MN-NREF 311 may execute the re-selection procedure taking into account the decision of the MN-NRDF 309, e.g. the attachment functionality of the UE in 3GPP.

Using this architecture of FIG. 3, the following steps may be executed for access network re-selection.

In a step 1, the N-NRDF 303 may make the decision on network re-selection policies that the MN-NRDF 309 has to execute when a handover event happens.

In a step 2, the N-NRDF 303 may send an indication with the decision policies to the MN-NRDF 309.

In a step 3, the N-NRDF 303 may make the decision which access network would the MN-NRDF 309 decide to re-select in case a handover event happens.

In a step 4, the N-NRDF 303 may send a network re-selection indication to the N-NREF 305 to establish a volatile-shallow context on the access network which the MN-NRDF 309 would decide to re-select in case a handover event happens. The network re-selection indication may contain the identity of the mobile node which may contain the MN-NRDF 309 and the MN-NREF 311.

In a step 5, the N-NREF 305 may execute the establishment of the volatile-shallow context on the access which the MN-NRDF 309 would decide to re-select in case a handover event happens. The volatile-shallow context may be created based on the indication received from the N-NRDF 303 and may contain one or more than one procedure part of the re-selection procedure which can be executed without a communication to the mobile device.

In a step 6, time independent of the previous steps, the MN-NRDF 309 may receive a handover event and may make the decision which access network to be re-selected due to the event.

In a step 7, the decision is enforced to the MN-NREF 311 which may re-select the access network on which the N-NREF 305 established the volatile-shallow context. The context may be activated by this enforcement.

Further, FIG. 4 to 9 show three implementation examples A to C in the 3GPP Evolved Packet Core architecture. In detail:
Example A: Establishment and activation of the volatile-shallow context in E-UTRAN
Example B: Establishment and activation of the volatile-shallow context in UTRAN/GERAN
Example C: Establishment and activation of the volatile-shallow context in non-3GPP access networks For all the examples A, B and C, the following setup is considered: The mobility protocol selected is Proxy Mobile IPv6 (PMIPv6). The mobile device, denominated as User Endpoint (UE) conformant to the 3GPP specification, is connected to one source access network of the same or of a different type than the target access network. PMIPv6 is also considered as mobility protocol over this source access network. A connection to the Access Network Discovery and Selection function is available in either PUSH or PULL mode.

For clarity, in the examples, the procedure for the establishment of the volatile-shallow context and the procedure for the activation of the volatile-shallow context are presented separately.

Figure 4:
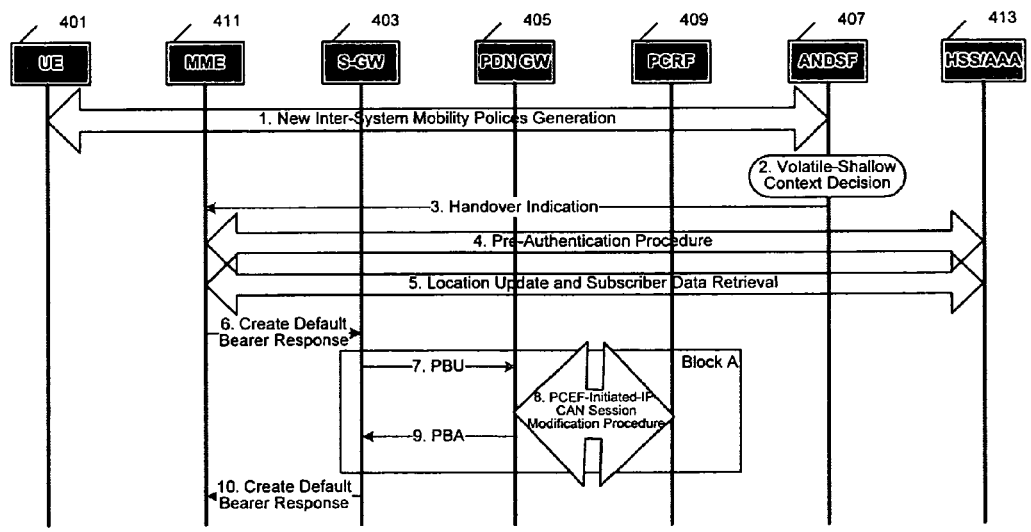
FIGS. 4 and 5 show an embodiment of procedures for an establishment and an activation of the volatile-shallow context in E-UTRAN.
Figure 5:
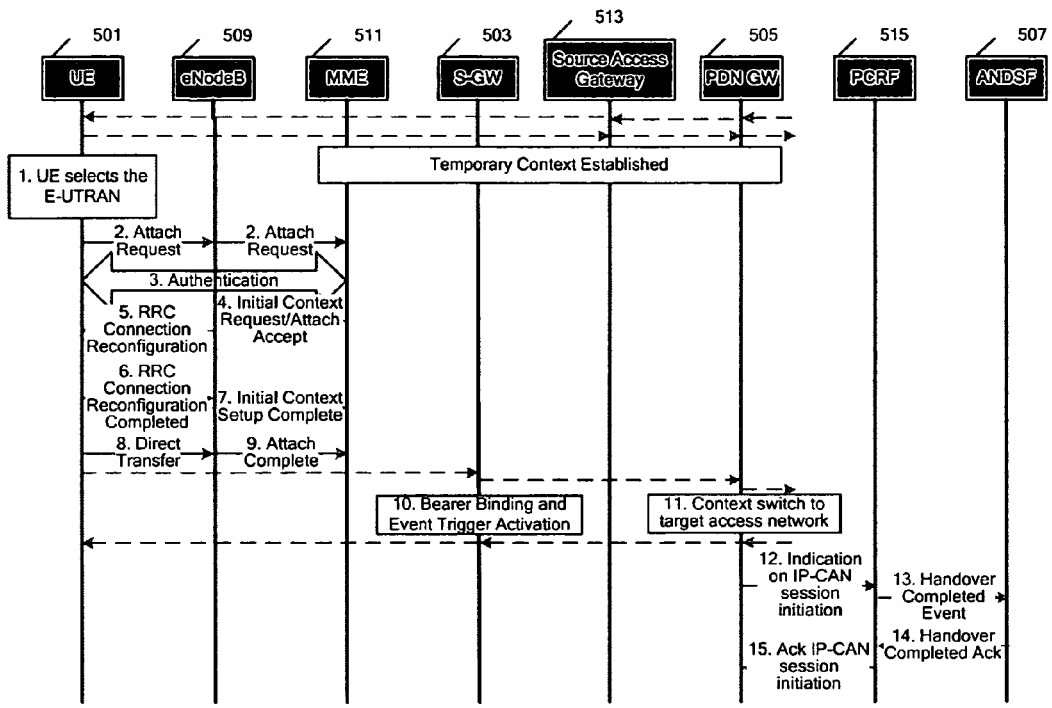

Referring to Example A, FIGS. 4 and 5 show an embodiment of procedures for an establishment and an activation of the volatile-shallow context in E-UTRAN. In detail, FIG. 4 illustrates the establishment and FIG. 5 the activation of temporary-conditional context in E-UTRAN.

The procedure describes how the temporary-conditional context is established on the target access network gateway for the E-UTRAN access network.

In the following, by way of example, the following setup is considered in FIG. 4: The mobility protocol selected is Proxy Mobile IPv6 (PMIPv6). A mobile device 401, denominated as UE conformant to the 3GPP specifications, is connected to a 3G network, through a SGSN and a Serving Gateway (S-GW) 403, wherein, by way of example, only the S-GW 403 is depicted. A PMIPv6 tunnel may be established between the S-GW 403 and the Packet Data Network Gateway (PDN GW) 405. A connection over the 3G network is established with the Access Network Discovery and Selection Function (ANDSF) 407, e.g. using the PUSH mode.

The resource reservation is controlled by a Policy and Charging Rules Function (PCRF) 409. Multiple WiFi accesses are available in the area where the UE 401 is located. To connect using the EPC to the network, an extended Packet Data Gateway (ePDG) 509 is deployed. The preference of the operator at the beginning of each of the example scenarios is to maintain the UE 401 camped in the 3G network. During the procedures exemplified here the preference of the operator changes and the ANDSF 407 makes the decision to hand over the UE 401 to one of the WiFi networks available. Only that WiFi access network is depicted. Furthermore, a MME 411 and a HSS/AAA 413 are provided.

In a step 1, new inter-system mobility policies may be generated for the UE 401 by the ANDSF 402. The ANDSF may make the decision due to a change in the parameters available in the network or due to a request received from the UE. The new policies may be transmitted to the UE containing the access networks that the UE may select for ensuring the service continuity.

In a step 2, the ANDSF 407 may make a decision whether a temporary-conditional context will be beneficial for one or more of the access networks to which the UE 401 may handover to due to the new inter-system mobility policies.

For non-3GPP accesses, the decision may be taken when the probability that the UE 401 will handover to that access network is high. For example, it has a high probability of losing signal on the source access network or it has the policy to handover to a specific non-3GPP access network when it becomes visible to the UE 401. Also, the handover from the source access network may have to be executed fast, for liberating the used resources or because the connectivity of the UE 401 is lost.

For the 3GPP accesses, the decision may be taken when the probability that the UE 401 will handover to that access network is high, e.g. it is connected to a WiFi hotspot with small coverage and the location is changing fast. The 3GPP access networks may be considered as a backup solution in case the connectivity over non-3GPP accesses may be suddenly lost.

For E-UTRAN access network, the ANDSF 407 may also select the MME 411 which would serve the UE 401 in case a handover is executed.

In a step 3, the ANDSF 407 may transmit a "Handover Indication" to the MME 411 of the E-UTRAN. It may be presumed that the ANDSF 407 may be able to determine to which access network(s) the UE 401 will handover to because the ANDSF 407 has transmitted to the UE 401 the inter-system mobility policies, which may contain the preferences of the operator for the selection of the access networks and it is aware of the momentary location of the UE 401. It may be considered that by knowing the access networks to which the UE 401 may handover to, the ANDSF 407 may be aware of the MME 411 which will serve the subscriber in the specific access network.

In a step 4, the MME 411 may contact the HSS 413 and authenticates the UE 401. The authentication procedure may be based on the IMSI and executed only on the network side. A further authentication procedure may be executed between the MME 411 and the UE 401 as described in TS 23.401 in the attachment procedure to the E-UTRAN. The procedure executed in this step may be the procedure of TS 33.401 section 6.1.2 in which the MME 411 may retrieve authentication vectors from the HSS 413 based on the IMSI received in the previous step from the ANDSF 407.

In a step 5, after successful authentication, the MME 411 may perform location update procedure and subscriber data retrieval from the HSS 413. The PDN GW 405 identity conveyed to the MME 411 may be stored in the PDN subscription context. The MME 411 may receive also information on the PDNs the UE 401 is connected to over the source access network in the Subscriber Data obtained from the HSS 413 and a default PDN GW 405.

In a step 6, the MME may select an S-GW for the case no APN was provided by the UE 401 as described in TS 23.401. The MME 411 may send a Create Default Bearer Request, in particular including the IMSI, MME Context ID, PDN-GW address, Handover Indication, APN, message to the selected S-GW 403. The Handover Information received from the ANDSF 407 may be included.

In a step 7, the S-GW 403 sends a modified Proxy Binding Update message to the PDN GW 405. It may contain a new value in the Handover Indication which may indicate that the tunnel has only to be created and that the data traffic may not be routed through it unless uplink data traffic is received or the source tunnel is not available anymore. The handover indication information received from the MME may be included in the information transmitted to the PDN GW 405.

Since the Handover Indication may be included, the PDN GW 405 may not switch the tunnel from the target access network to the E-UTRAN at this moment.

In a step 8, since the Handover Indication may be included, the PDN GW 405 may execute a PCRF-Initiated IP-CAN Session Modification procedure as following:

The PDN GW (LMA) 405, on receive of the PBU, may introduce in the Binding Update List a new entry marked as back-up and may establish the tunnel end at its premises without routing any data traffic to this tunnel. In particular, data traffic may be exchanged on the source access network. The PCRF Initiated IP-CAN session modification procedure may be executed. It may contain the following steps:

The PDN GW 405 may determine that the PCC interaction is required and may send an Indication on IP-CAN session modification, e.g. Event Report, affected PCC Rules, to the PCRF 409. The Indication on IP-CAN session modification may contain the Temporary Conditional Flag which was determined by the PBU.

The PCRF 409 may correlate the request for PCC Rules with the IP-CAN session and service information available at the PDN GW 405 (PCRF). The PCRF 409 may maintain in the subscriber structure that a volatile-shallow context is created.

The PCRF 409 may make the authorization and the policy decision. The policy decision considers that the IP-CAN bearer may be established in the near future.

Moreover, the PCRF 409 may send an acknowledgement of IP-CAN session modification to the PCRF. The acknowledgement may contain the PCC rules which have to be considered in the case the connectivity over the source access network is terminated or that connectivity over the target access network is established.

The PCRF may maintain the PCC rules and Event Triggers for the target bearer until it gets activated. No operation may be executed. As the goal of this operation is service continuity it is probable that no major differences exist between the PCC rules for the source access network and the rules for the target access network.

The establishment of the dedicated bearers may be replaced by the notification of the S-GW 403 and the PDN GW 405 which the dedicated bearers may be in case a handover will be executed.

The new PCC rules may be maintained by the PDN GW 405 while the old rules from the target access network are maintained.

In a step 9, the PDN GW 405 responds with a PBA message to the S-GW 403. The response may contain the IP address or prefix assigned to the UE 401, in case the UE 401 will attach to the target access network.

In a step 10, the S-GW 403 may respond with a Create Default Bearer Response to the MME 411. This message may also include the IP address of the UE 401. This serves for the MME 411 as an indication that the temporary-conditional context was established on step 5.

The access bearers may be established from the network side during this procedure, without the reservation of the resources. This further may reduce the activation of the new context on the E-UTRAN access network. As described in TS 23.401 Section 5.4.1, the dedicated bearers' establishment procedure can be initiated by the PDN GW 405. As in this phase, the communication with the UE 401 is not possible, and then the information on the bearers may be maintained in the MME 411 as part of the volatile-shallow context and the bearers to be established during the context activation procedure.

Referring to FIG. 5 for the activation of temporary-conditional context in E-UTRAN, the topology of FIG. 5 is based on that of FIG. 4. Further, an eNodeB is arranged between the UE 501 and the MME 511. Moreover, a Source Access Gateway 513 is coupled between the S-GW 503 and the PDN GW 505 and a PCRF 515 is coupled between the PDN GW 505 and the ANDSF 507.

As prerequisite for this procedure, the UE is able to exchange data both uplink and downlink through the source access gateway and the PDN GW. A volatile-shallow context was established in the target E-UTRAN access network and in the PDN GW.

In a step 1, the UE 501 may select the E-UTRAN network because of a handover trigger is received in the UE 501 and because the inter-system mobility policies of the UE 501 consider that it has to attach to the E-UTRAN.

In a step 2, the UE 501 may initiate the Attach procedure by the transmission to the eNodeB 509 of an Attach Request as in the TS 23.401 section 5.3.2.1 step 1.

The eNodeB 509 may derive the MME 511 from the RRC parameters and select the MME 511. It may forward the attach request to the MME 511 contained in an Initial UE message.

In a step 3, the authentication procedure may be executed. As the MME 511 is aware of the identity of the UE, the procedure may be reduced or may be entirely skipped.

In a step 4, the MME 511 may determine the UE AMBR to be used by the eNodeB 509 on the subscriber UE-AMBR and the APN-AMBR for the default APN. An attach request may be sent by the MME 511 to the eNodeB 509. This step may be the same as step 17 from the initial attachment to E-UTRAN procedure TS 23.401 section 5.3.2.1.

The initial context setup request may contain the information on all the bearers of the UE 501 which was previously stored in the MME 511 at the establishment of the volatile-shallow context. No communication with the S-GW and through it to the PDN GW and PCRF may be necessary.

In a step 5, the eNodeB 509 may send the RRC Connection Reconfiguration as in step 18 of the E-UTRAN initial attachment procedure, see TS 23.401 section 5.3.2.1. The UE 501 may receive the IP address at this step or by router solicitation/router advertisement mechanism.

In a step 6, the UE 501 may send the RRC Connection Reconfiguration Complete message to the eNodeB 501, see TS 23.401 section 5.3.2.1 step 19.

In a step 7, the eNodeB 509 sends the Initial Context Response message to the MME 5111. This Initial Context Response message may include the TEID of the eNodeB 509 and the address of the eNodeB 509 used for downlink traffic, see TS 23.401 section 5.3.2.1 step 20.

In a step 8, the UE 501 may send a Direct Transfer message to the eNodeB 509 which may includes the Attach Complete message, see TS 23.401 section 5.3.2.1 step 21.

In a step 9, the eNodeB 509 may forward the Attach Complete message to the new MME, see TS 23.401 section 5.3.2.1 step 22.

In a step 10, the first upload packet may trigger the activation of the temporary-conditional context in the S-GW 503. The activation may include the deployment of the QoS rules and of the Event Triggers and the bearer activation on the S-GW 503. It may also include the activation of the PMIP tunnel to the PDN GW 505 from the S-GW 503 side. All the bearers may be considered as active.

In a step 11, on receiving the first upload packet at the PDN GW 505, the PCC rules and Event Triggers may be activated for the target access network. The PCC rules and the Event Triggers may already be available from the establishment of the volatile-shallow context. The tunnel created by the PBU may be considered as the active tunnel and the downlink data traffic may be transmitted through it. For GTP tunnelling, the packets may be routed to the target S-GW 503. All the bearers over the E-UTRAN may be considered as active.

In a step 12, an indication on IP-CAN session modification may be transmitted to the PCRF 515. As the PCRF 515 may already have deployed the QoS rules, the PCC rules and the Event Triggers at the establishment of the temporary-conditional context, no internal decision has to be taken.

In a step 13, an indication on handover completion may be transmitted to the ANDSF 507. The ANDSF 507 as the initiator of the volatile-shallow context may be aware that the handover procedure has succeeded and that the UE 501 is attached to the target access network.

In a step 14, the handover completion event may be acknowledged by the ANDSF 507.

In a step 15, the indication on IP-CAN session modification may be acknowledged.

After the authentication of the UE 501 to the E-UTRAN, the MME 511 may transmit a Create Default Bearer Request to the S-GW 503 as to announce the S-GW 503 of the new UE attachment. In this case, the S-GW 503 may activate the context in parallel to the context setup on the wireless link.

The request may be forwarded to the PDN GW 505 or a PBU may be transmitted to the PDN GW 505. This enables the PDN GW 505 to be announced that the UE 501 is attaching to the E-UTRAN. From this moment on, if the connectivity to the source access network is lost, the PDN GW 505 may activate the volatile-shallow context, as it is already aware that the UE 501 initiated the handover to it. This may ensure a minimal loss of packets during the handover procedure in the case the connectivity to the source access network is lost during the handover procedures.

The attachment procedure to the target access network may happen synchronously with the establishment of the temporary-conditional context. As all the control of the attachment to the E-UTRAN is given to the MME 511, the MME 511 may act as a synchronization point for the establishment and attachment.

For the authentication procedures, the same considerations as in the case of the non-3GPP access networks may be given.

For the context activation of the bearers, if the pre-establishment in the MME 511 and in the S-GW 503 was executed, then the communication between the UE 501 and the MME 511 may be executed as in the procedure described between steps 4 and 9. If the procedure for pre-establishment of bearers in the network side is in execution, the communication between the UE 501 and the MME 511 can be executed for the given bearers and if the pre-establishment procedure was not initiated, then a complete bearer establishment procedure may be executed.

If the UE 501 maintained the bearer context from a previous attachment to the E-UTRAN and the bearer information was transmitted to the MME 511 and S-GW 503 at the establishment phase, then there is no need for the communication for establishing of the dedicated bearers. This reduces furthermore the attachment procedure with previous established temporary-conditional context.

Figure 6:
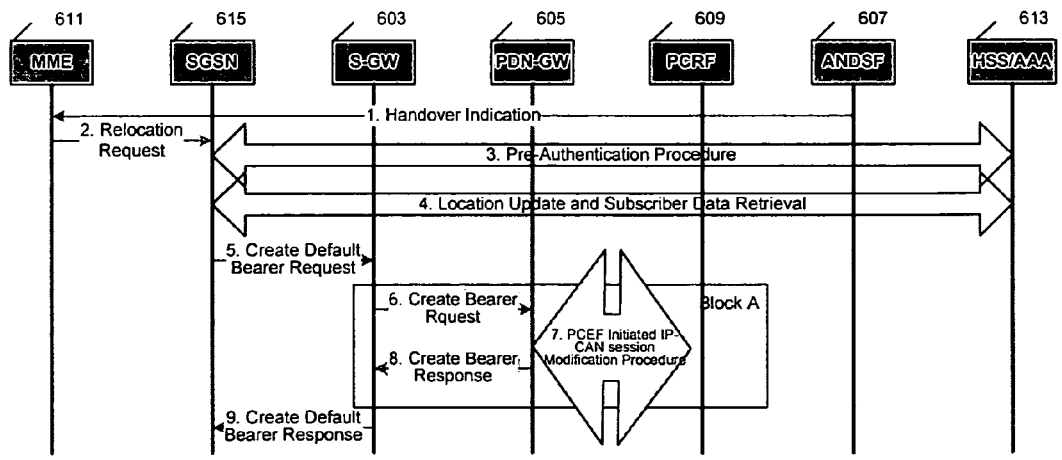
FIGS. 6 and 7 show an embodiment of procedures for an establishment and an activation of the volatile-shallow context in UTRAN/GERAN.
Figure 7:
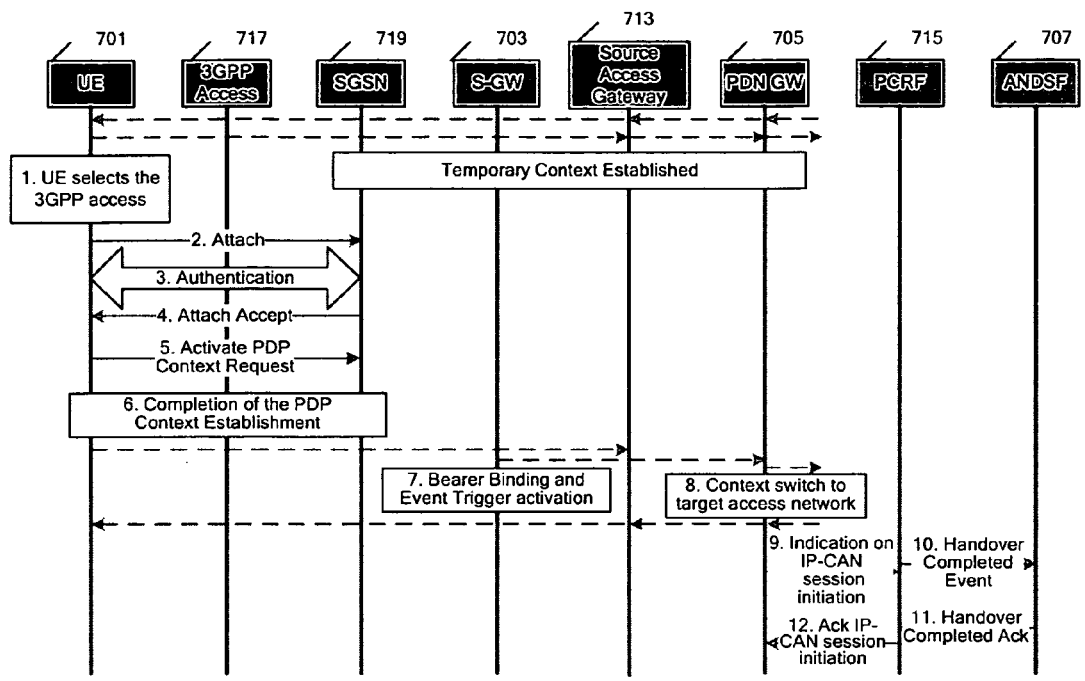

Referring to Example B, FIGS. 6 and 7 show an embodiment of procedures for an establishment and an activation of the volatile-shallow context in UTRAN/GERAN. In detail, FIG. 6 illustrates the Temporary-Conditional Context Establishment for GERAN/UTRAN and FIG. 7 the Temporary-Conditional Context Activation for GERAN/UTRAN.

The procedure describes how the temporary-conditional context is established on the target access network gateway for GERAN/UTRAN access networks.

Referring to FIG. 6 for the Temporary-Conditional Context Establishment for GERAN/UTRAN, the topology of FIG. 5 is based on that of FIG. 4. Further, an SGSN 615 is arranged between the MME 611 and the S-GW 603.

In a step 1, a "Handover Indication" may be transmitted by the ANDSF 607 to the MME 611. The handover indication may be transmitted in the conditions described for the establishment of the context in E-UTRAN.

In a step 2, the MME 611 may determine from the "Target System Identifier" received from the ANDSF 607 in the "Handover Indication" that a handover from a non-3GPP access technology may be executed. The Target MME may initiate the handover resource allocation procedure by sending a Forward Relocation Request. The relocation procedure may include that the resources have to be reserved for the primary PDP context or all the secondary PDP or none.

In a step 3, the pre-authentication procedure for the UE may be executed, similar to step 4 of the E-UTRAN establishment procedure in the previous example.

In a step 4, the location may be updated and the subscriber data may be retrieved, similar to step 5 of the E-UTRAN establishment procedure example for E-UTRAN.

In a step 5, the procedure from step 5 to step 9 may be similar to the E-UTRAN establishment procedure of the previous example. The PDP context in the temporary-conditional context may include the first PDP context activation as to reduce the delay of the attachment to the target access network. Also if considered, the rest of the secondary PDP contexts may be activated. As not to consume resources on the target SGSN 615, the information of the primary and secondary PDP contexts may be only maintained as it is expected that during the execution of the handover procedures, the UE will send to the SGSN the "Activate PDP context Request" message as described in TS 23.402 section 8.2.1.3 step 7.

This procedure presumes that modifications are to be brought to the SGSN. It may be assumed that the modifications which are brought to the SGSN 615 to be minimal.

If the SGSN 615 maintained a PDP context from a previous attachment of the UE to the GERAN or UTRAN, then only procedures from Step 5 to Step 9 may be executed. This property may enable a fast activation of the temporary-conditional context.

In this perspective, the temporary-conditional context may limit the information which may be maintained in the system if the PDP context information is maintained, as the PDP context information maintained may remain only in the SGSN 615 and may be remaining also in the S-GW 603.

As the PDP context activation depends on the communication with the UE, the PDP context activation cannot be executed prior to the attachment of the UE to GERAN/UTRAN.

The mechanism here presented may substitute itself to the PDP context maintenance in the GERAN/UTRAN. The context may be deleted immediately after the UE is detached from the access network and it may be re-created in the network only when a handover becomes probable, decision made by the ANDSF 607. The UE may maintain its part of the PDP context while the one from the S-GW 603 may be recreated upon the ANDSF trigger.

This procedure describes the activation of the GERAN/UTRAN temporary-conditional context triggered by the attachment of the UE to the access network.

As prerequisite for this procedure, the UE may be able to exchange data both uplink and downlink through the source access gateway and the PDN GW 605. A temporary-conditional context was established in the target GERAN/UTRAN access network and in the PDN GW 605.

Referring to FIG. 7 for the Temporary-Conditional Context Activation for GERAN/UTRAN, the topology of FIG. 7 is based on that of FIG. 5. Further, a 3GPP Access 717 and a SGSN 719 are arranged between the UE 701 and the S-GW 703.

In a step 1, the UE 701 may select the GERAN/UTRAN access network due to a handover trigger available at the UE 701.

In a step 2, the UE 701 may send an Attach Request to the SGSN 719. The message from the UE 701 may be routed by the 3GPP Access 717 to the specified SGSN 719 as in Section 6.5 of TS 23.060.

In a step 3, the authentication procedure may be executed. As the SGSN 719 is aware of the identity of the UE 701, the procedure may be reduced or may be entirely skipped. The location update can be performed in the establishment phase or in this procedure.

In a step 4, the S-GW 703 may send the Attach Accept request to the UE 701 to indicate the completion of the attach procedures as defined in the TS 23.060.

In a step 5, the UE 701 may initiate the establishment of the primary PDP context. The S-GW 703 was already selected in the establishment procedure and the S-GW 703 may be aware that a handover procedure may be executed. Therefore, no message to the S-GW 703 should be sent.

In a step 6, the rest of the PDP context establishment may be executed between the UE 701 and the SGSN 719. The communication with the S-GW 703 was executed in the establishment of the temporary-conditional context.

In a step 7, the first upload packet may trigger the activation of the temporary-conditional context in the S-GW 703. The activation may include the deployment of the QoS rules and of the Event Triggers and the bearer activation on the S-GW 703. It may also include the activation of the GTP/PMIP tunnel to the PDN GW 705 from the S-GW 703 side. All the bearers may be considered as active.

In a step 8, on receiving the first upload packet at the PDN GW 705, the PCC rules and Event Triggers may be activated for the target access network. The PCC rules and the Event Triggers may already be available from the establishment of the temporary-conditional context. Also, if PMIP is deployed, the tunnel created by the TPBU may be considered as the active tunnel and the downlink data traffic may be transmitted through it. For GTP tunnelling, the packets may be routed to the target S-GW. All the bearers over the E-UTRAN may be considered as active.

In a step 9, an indication on IP-CAN session modification may be transmitted to the PCRF. As the PCRF 715 has already deployed the QoS rules, the PCC rules and the Event Triggers at the establishment of the temporary-conditional context, no internal decision has to be taken.

In a step 10, an indication on handover completion may be transmitted to the ANDSF 707. The ANDSF 707 as the initiator of the temporary-conditional context may be aware that the handover procedure has succeeded and that the UE 701 is attached to the target access network.

In a step 11, the handover completion event may be acknowledged by the ANDSF 707.

In a step 12, the indication on IP-CAN session modification may be acknowledged.

After the authentication of the UE 701 to the GERAN/UTRAN, the S-GW 703 may transmit a Create Default Bearer Request to the S-GW as to announce the S-GW 703 of the new UE attachment. In this case, the S-GW 703 may activate the context in parallel to the context setup on the wireless link.

The attachment procedure to the target access network may happen synchronously with the establishment of the temporary-conditional context. As all the control of the attachment to the GERAN/UTRAN may be given to the SGSN 719, the SGSN 719 may act as a synchronization point for the establishment and attachment.

For the authentication procedures, the same considerations as in the case of the non-3GPP and E-UTRAN access networks may be given.

For the PDP context activation for both primary and secondary contexts, if the pre-establishment in the SGSN 719 and in the S-GW 703 was executed, then the communication between the UE 701 and the SGSN 719 can be executed as in the procedure described steps 7 and 8. If the procedure for pre-establishment of bearers in the network side is in execution, the communication between the UE 701 and the SGSN 719 can be executed for the given PDP contexts and if the pre-establishment procedure was not initiated, then a complete PDP context establishment procedure may be executed.

If the UE 701 maintained the PDP context from a previous attachment to the E-UTRAN and the PDP context information was transmitted to the SGSN 719 and S-GW 703 at the establishment phase, then there may be no need for the communication for establishing of the dedicated bearers. This may reduce furthermore the attachment procedure with previous established temporary-conditional context.

This procedure may involve the modification of the SGSN 719. In order to limit the modifications brought to the SGSN 719, the secondary PDP contexts may be activated from the S-GW 703. In this case, a Create Default Bearer Request should be transmitted from the SGSN 719 to the S-GW 703 after the receiving of the Activate PDP Context Request from the UE 701 (step 7). The S-GW 717 may then initiate PDP context activation procedure as in TS 23.060 section 9.2.2 without Block A and Block B.

Figure 8:
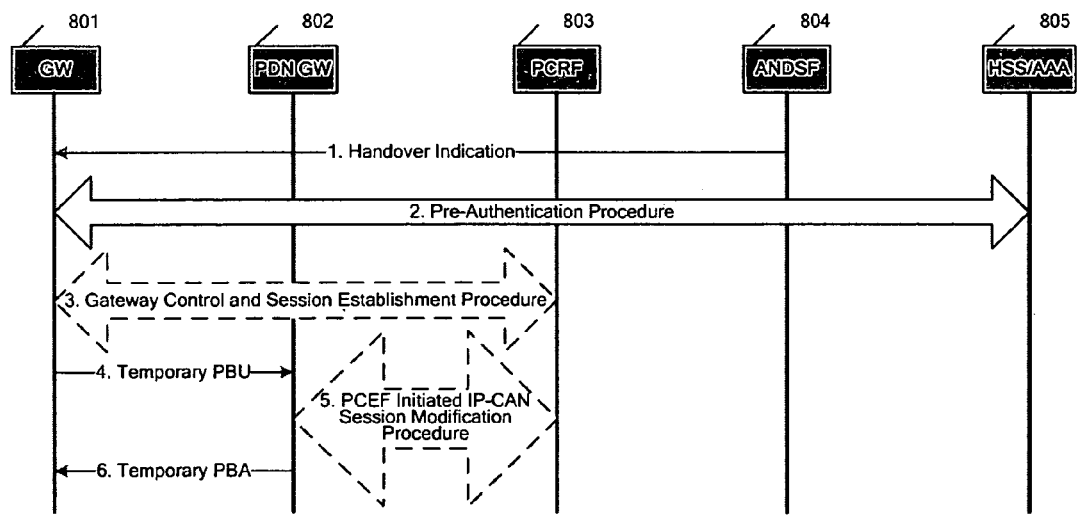
FIGS. 8 and 9 show an embodiment of procedures for an establishment and an activation of the volatile-shallow context in non-3GPP access networks.
Figure 9:
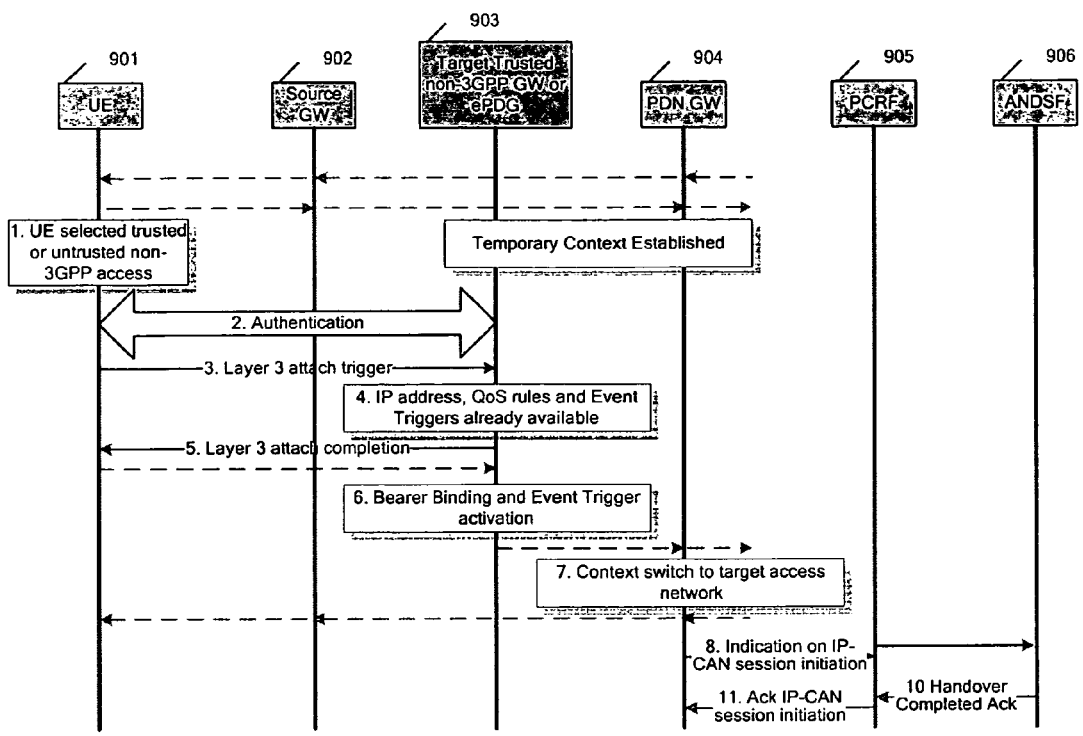

Referring to Example C, FIGS. 8 and 9 show an embodiment of procedures for an establishment and an activation of the volatile-shallow context in non-3GPP access networks. In detail, FIG. 8 illustrates the Temporary Conditional Context Establishment for Trusted or Untrusted non-3GPP access network and FIG. 9 the Activation of temporary-conditional context on attachment condition.

The procedure describes how the temporary-conditional context is established on the target access network gateway for the trusted or untrusted non-3GPP accesses.

In detail, FIG. 8 makes use of the depicted entities GW 801, PDN GW 802, PCRF 803, ANDSF 804 and HSS/AAA 805.

In a step 1, the ANDSF 804 may transmit a "Handover Indication" to the Gateway of the specific access networks containing the subscriber's identity and an expiration value for the temporary conditional context.

It may be presumed that the ANDSF 804 may be able to determine to which access network(s) the UE will handover to because the ANDSF 804 may have transmitted to the UE the inter-system mobility policies, which may contain the preferences of the operator for the selection of the access networks and it may be aware of the momentary location of the UE.

It is considered that by knowing the access networks to which the UE may handover to, the ANDSF 804 may be aware of the access network gateway which will serve the subscriber in the specific access network. This procedure may not be applied when the gateway is selected by the UE using other mechanisms, e.g. the ePDG selected by DNS query. Even in these cases, if the ANDSF inter-system mobility policies may contain the address of the gateway and that address has a pre-emption property over the address obtained by DNS, then it may be considered that the ANDSF 804 selected the gateway for the UE, thus it may be aware to which gateway the UE will attach to.

In a step 2, if the target access network to which the UE may connect to requires that an authentication procedure may be executed, then a pre-authentication procedure may be executed as described in TS 33.234.

The AAA Server 805 may query the HSS 805 and may return the PDN GW 802 identity. It may also return the MN NAI to be used to identify the UE in the Proxy Binding Update and Gateway Control Session Establishment messages.

In a step 3, if it is the case, i.e. in the trusted non-3GPP accesses, a Gateway Control and Session Establishment procedure may be executed. It contains the following steps 3.1 to 3.4 (as in TS 23.203 section 7.7.1.1):

In the step 3.1, a Gateway Control Session Establishment request may be sent by the GW 801 to the PCRF 803. The following information may be included: the IP-CAN Type, the UE Identity received from the ANDSF in step 1, the PDN identifier (if known), IP addresses (if known) and the IP-CAN Bearer Establishment modes supported.

The IP-CAN type may identify the type of access used by the UE. The subscriber identity and the PDN Identifier may be used to identify the subscriber and in the PCRF selection to locate the PCRF function with the corresponding IP-CAN session establishment by the PDN GW 802.

The PCRF 803 may note that this Gateway Control Session Establishment does not refer to the information maintained on the UE for the source access network. The information maintained in the PCRF 803 for the target access network and received in this request may be maintained separately of the information received from the source access network).

In the step 3.2, If the PCRF 803 is required to interact with the PDN GW 802 (PCRF), the PCRF 803 may wait until it is informed about the establishment of the corresponding IP-CA session (see following step 5.2 of this procedure) and may perform a PCRF initiated IP-CAN session modification procedure with the PDN GW 802 (PCRF).

In the step 3.3, the PCRF 803 may send an Acknowledge Gateway Control Session Establishment to the Gateway (BBERF). It may contain the QoS policy rules for Bearer Binding and the Event Triggers on which reports from the BBERF are required. The QoS policy rules may contain the flag that they are Temporary-Conditional and optionally may contain an expiration timer.

In the step 3.4, the QoS Rules and Event Triggers received by the gateway may be deployed. The Event Triggers and the QoS rules may be not considered active.

The Bearer Binding may be not executed, but the information may be maintained in the GW until the activation of the temporary-conditional context as described in the next procedures.

The resources required by the subscriber may be not reserved and may be considered to be uncertain with an operator specified probability. This may allow that more than the resources available on a specific access network for a specific location to be pre-reserved based on the probability that this temporary-conditional context may become active or not.

The Event Triggers may be maintained and may be not activated until the UE attaches to the target access network.

In a step 4, if PMIP is deployed as mobility protocol, a PBU may be transmitted. The PBU may include a new Handover Indication value which indicates to the LMA that the PMIP PBU may be not transmitted as to replace the existing binding in the LMA.

In a step 5, the PDN GW (LMA) 802, on receive of the PBU, may introduce in the Binding Update List a new entry marked as back-up and may establish the tunnel end at its premises without routing any data traffic to this tunnel. In particular, data traffic may be exchanged on the source access network. The PCRF Initiated IP-CAN session modification procedure may be executed. It may contain the following steps:

In the step 5.1, the PDN GW 802 may determine that the PCC interaction is required and may send an Indication on IP-CAN session modification (Event Report, affected PCC Rules) to the PCRF 803. The Indication on IP-CAN session modification may contain the Temporary Conditional Flag which was determined by the TBPU.

In the step 5.2, the PCRF 803 may correlate the request for PCC Rules with the IP-CAN session and service information available at the PDN GW (PCRF) 802. The PCRF 803 may maintain in the subscriber structure that a temporary-conditional context is created.

In the step 5.3, the PCRF 803 may make the authorization and the policy decision. The policy decision may consider that the IP-CAN bearer may be established in the near future.

In the step 5.4, the PCRF 803 may send an acknowledgement of IP-CAN session modification to the PCRF 803. The acknowledgement may contain the PCC rules which have to be considered in the case the connectivity over the source access network is terminated.

In the step 5.5, the PCRF 803 maintains the PCC rules and Event Triggers for the target bearer until it gets activated. No operation may be executed. As the goal of this operation is service continuity, it may be probable that no major differences exist between the PCC rules for the source access network and the rules for the target access network.

In a step 6, a PBA may be sent to the GW 801. The GW 801 may establish its end of the PMIP tunnel. No downlink data may be received on the tunnel as the PDN GW 802 may not transmit data through the tunnel and no uplink data may be received as the UE is not attached to the target access network.

If MIPv4 is deployed in the trusted access network, the procedure from step 4 to step 6 may not be executed.

If DSMIPv4 is deployed in the trusted or untrusted non-3GPP access network, then the procedure from Step 4 to Step 6 is not executed.

During the handover procedures, the UE attaches to the target access network. In the case of the procedure presented here, the target access network is a trusted or untrusted non-3GPP access network. In this procedure, the temporary-conditional context may become the active context of the UE.

Referring to FIG. 9 for the Activation of temporary-conditional context on attachment condition, FIG. 9 makes use of the depicted entities UE 901, Source GW 902, Target Trusted non-3GPP GW or ePDG 903, PDN GW 904, PCRF 905, and ANDSF 906.

As prerequisite for this procedure, the UE is able to exchange data both uplink and downlink through the source access gateway and the PDN GW. A temporary-conditional context was established in the target trusted non-3GPP access gateway or in the ePDG and in the PDN GW.

In a step 1, the UE 901 may select the trusted or the untrusted non-3GPP access network.

In a step 2, the UE 901 may initiate the attachment to the target access network and the authentication procedures may be initiated. As the UE 901 was pre-authenticated during the temporary context establishment procedure, the communication for the authentication may be executed only between the UE 901 and the target access network gateway.

In a step 3, the layer 3 attach trigger may be transmitted to the target access gateway. In case of the untrusted non-3GPP access network, this step may be replaced with the IKEv2 tunnel setup.

In a step 4, in case PMIP is deployed as mobility solution, the IP address of the UE 901 may already be available at the target access network gateway and the tunnel may already be established. Also the PCRF-initiated IP-can session modification procedure was executed during the establishment phase. For the trusted non-3GPP accesses at this step, the gateway may activate the QoS rules and the Event Triggers.

In a step 5, a layer 3 Attach Completion message may be sent to the UE 901 containing the IP address in case PMIP is deployed. When the UE 901 receives the IP address, it may start transmitting the uplink data over the target access network.

In a step 6, either on step 4 or after receiving the first upload packet, the QoS rules and the Event Triggers may be activated if the gateway has BBERF functionality.

In a step 7, on receiving the first upload packet at the PDN GW 904, the PCC rules and Event Triggers may be activated for the target access network. The PCC rules and the Event Triggers may already be available from the establishment of the temporary-conditional context.

Also if PMIP is deployed, the tunnel created by the TPBU may be considered as the active tunnel and the downlink data traffic may be transmitted through it.

In a step 8, an indication on IP-CAN session modification may be transmitted to the PCRF 905. As the PCRF 905 has already deployed the QoS rules, the PCC rules and the Event Triggers at the establishment of the temporary-conditional context, no internal decision may have to be taken.

In a step 9, an indication on handover completion may be transmitted to the ANDSF 906. The ANDSF 906 as the initiator of the temporary-conditional context may be aware that the handover procedure has succeeded and that the UE 901 is attached to the target access network.

In a step 10, the handover completion event may be acknowledged by the ANDSF 906.

In a step 11, the indication on IP-CAN session modification may be acknowledged.

In particular, steps 8-11 can be executed asynchronously to the actual data exchange because the QoS rules, the PCC rules and the Event Triggers were decided by the PCRF in the prior establishment procedure.

If MIPv4 or DSMIPv6 is deployed on the trusted non-3GPP access network, then the MIPv4 registration request may be transmitted to the PDN GW after step 4 (steps 6-12 from TS 23.402 section 8.3, steps 7-9 from TS 23.402 section 8.4.2, steps 6-8 from TS 23.402 section 8.4.3).

In this case, a communication between the trusted non-3GPP access network 903 and the PDN GW 904 may be necessary. But the PCRF-Initiated IP-CAN session modification procedure (step 10 from the TS 23.402 section 8.3, step 8 from TS 23.402 section 8.4.2, step 7 from TS 23.402 section 8.4.3) may not have to be executed as being already executed at the establishment of the temporary-conditional context.

The attachment procedure to the target access network may happen synchronously with the establishment of the temporary-conditional context. As all the operations are initiated by the gateway of the specific access network, it may act as a synchronization point.

Each step of the procedure of establishing the temporary-conditional context has an equivalent step in the attachment procedure to the target access network.

For example, in the case of the trusted non-3GPP access networks, if the pre-authentication procedure was initiated and immediately after, before completion, the procedure of authentication of the UE 901 is initiated by the UE 901, then the gateway may have to receive the answer from the AAA Server/HSS before it can answer to the UE 901. This is also happening in the state of the art procedure. Therefore, the pre-authentication procedure may not introduce a synchronization problem with the UE authentication procedure.

If Gateway Control Session Establishment is required, then the execution of the procedure prior to the transmission of the layer 3 attach request or the attach request may be received during the execution of the procedure does not influence introduce a synchronization problem. The Gateway Control Session Establishment procedure may proceed to its end and its effective time may be reduced compared to the time in the state of the art due to its initiation prior to the attachment.

If the gateway has already transmitted a TProxy Binding Update to the PDN GW 904, no Proxy Binding Update has to be anymore transmitted. Therefore, there may be no synchronization problem at the PMIP level. The PCRF Initiated IP-CAN session modification procedure may have almost similar results. The one for the PBU instead maintains the data flows over the source access network if still available, while the PBU procedure may transmit the data to the target access network before the completion of all the attachment procedures.

For the untrusted non-3GPP access networks, the same considerations on the pre-authentication may be given.

For the Proxy Binding Update and the PCRF Initiated IP-CAN session modification procedure, the same explanation as for the trusted non-3GPP access networks may be given.

According to some implementations, an optimization of the handovers between heterogeneous access networks may be provided, by this in particular referring to handovers between different types of access networks.

According to some implementations, an establishment of a temporary-conditional context may be provided on the possible target access network prior to any other handover related procedures. Thus, the temporary-conditional context for different access network types may be used. The prior establishment of the temporary-conditional context reduces the number of the procedures that have to be executed in the time critical period of the handover execution.

According to some implementations, a single operator scenario may be provided in which the mobile device may be connected to a core network pertaining to one operator, which core network is able to offer to the mobile device connectivity over more than one access network of more than one type. The mobile device may have one or more device interfaces through which it may be able to connect to the more than one access network offered by the core network.

According to some implementations, an establishment and an activation of a temporary-conditional context may be provided as a result of a network discovery and selection decision made in the network for the specified mobile device. Such cases may be addressed in which the preferences of the operator and of the user of the mobile device are changed due to various external factors, e.g. a modification of the location of the user entity or of the available resources in the different access networks. Accordingly, a network made network discovery and selection decision may be presumed on which one or more of the access networks selected by the network for a possible future handover of the mobile device have a high probability to be selected by the mobile device. In this regard, a set of proactive procedures may be considered which may be executed on these one or more access networks which may reduce the duration of the handover procedures, in case the access network is selected by the mobile device at the cost of a proactive execution.

According to some implementations, architecture may be proposed for a fast handover procedure based on the information and procedures already executed in the target access network. The architecture may be based and may not be limited to the 3GPP Evolved Packet Core (EPC) standardized by 3GPP. It may introduce new functionality and new procedures between the network entities which enable the proposed method.

As indicated above, the 3GPP Evolved Packet Core may be addressed and it may be targeted the optimization of the handover procedures especially from non-3GPP access networks in which the connection may be suddenly lost, e.g. WiFi and 3GPP access networks in which the attachment procedures may have a long duration, although it addresses any type of handover between non-3GPP and 3GPP accesses.

According to some implementations, the concept of volatile-shallow context may be introduced which is established in the target access network prior to any handover trigger (active or proactive) which may consist of an exchange of information between the network entities which in the state of the art case—as discusses later for comparison issues—would be available only at the attachment procedure.

Because the information may be available already in the target access network before the handover trigger, the procedures that are executed after it, the required network procedures which would be otherwise executed during the preparation and the execution phase of the handover are not executed anymore, such that the handover duration may be reduced.

For the attachment to the 3GPP access networks, the following operations may be executed during the establishment phase of the volatile-shallow context procedure, which would be executed during the handover procedure in the state-of the art case:

In a step 1, the identity of the subscriber may be transmitted to the MME/SGSN—the two entities which control the attachment procedures may receive the identity of the subscriber for which the volatile-shallow context is realized.

In a step 2, a pre-authentication procedure may be done. The pre-authentication procedure may include a communication with the HSS which would be executed during the handover procedures in the state-of the art. The procedure may be based on the identity of the subscriber received in the previous operation. In sum, two messages may be exchanged in the network, HSS/AAA Server internal operations and SGSN/MME internal operations may be done.

In a step 3, subscriber data retrieval may be done. In detail, the MME or SGSN queries the HSS for the information on the subscriber. In sum, two messages are exchanged in the network and HSS internal operations and SGSN/MME internal operations may be done.

In a step 4, default bearer and dedicated bearer information operations may be done. In detail, the MME and the SGSN may communicate with the S-GW in order to inform the S-GW of the default bearer/primary PDP context. In sum, at least two messages may be exchanged in the network and operations may be done in the end entities.

In a step 5, mobility protocol establishment may be done. In detail, in the case PMIP is deployed, the PMIP tunnel may be established, but the data traffic may not be routed through it. In sum, two messages may be exchanged in the network and operations in the end entities may be done.

In a step 6, IP-CAN session modification procedure is done. In particular, the PDN GW may receive the PCC rules and event triggers for the case a handover procedure is to be executed to the target access network. The rules are not enforced until the activation of the context. In sum, two messages may be exchanged in the network and operations in the end entities including the PCRF decision may be done.

In a step 7, a Gateway Control Session may be done. The S-GW may receive the QoS rules and the event triggers for the case a handover procedure is to be executed to the target access network. The rules are not enforced until the activation of the context. In sum, two messages may be exchanged in the network and operations in the end entities including PCRF decision may be done.

In the state of the art, when a handover event is received by the mobile device, the following operations may be executed in order to handover to the 3GPP access network (see TS 23.402 Section 8.2.1.1 for E-UTRAN and TS 23.402 Section 8.2.1.3 for GERAN/UTRAN):

In a step 1, an attachment of the user equipment (UE) to the 3GPP access network is done. This operation is also executed in the case of a volatile-shallow context. (For E-UTRAN step 3, for GERAN/UTRAN step 3).

In a step 2, an access authentication operation is executed. The operation presumes the communication between the UE and the MME/SGSN and between the MME/SGSN and the HSS/AAA Server. In case of using a volatile-shallow context, no communication is necessary between the MME/SGSN and the HSS/AAA Server, because the authentication vectors are already retrieved during the establishment phase of the volatile-shallow context. (For E-UTRAN step 4, for GERAN/UTRAN step 4).

In a step 3, a Subscriber Data Retrieval is done. This operation is executed between the MME/SGSN and the HSS/AAA Server. In case of using a volatile-shallow context, it is not executed anymore, because it has been executed during the establishment of the context. (For E-UTRAN step 5, for GERAN/UTRAN step 5).

In a step 4, an activation of the primary PDP context is done in case of GERAN/UTRAN signalled by the UE. This operation has to be executed for the volatile-shallow context, too. No correspondent operation is available in E-UTRAN, for GERAN/UTRAN step 7).

In a step 5, a signalling to the S-GW the default bearer is done. This operation does not have to be executed in the case of using a volatile-shallow context, because the bearers were already signalled in the establishment procedure (For E-UTRAN step 6 and 10, for GERAN/UTRAN step 6 and 12).

In a step 6, a signalling of the PDN GW is done on the new subscriber including mobility protocol. This operation does not have to be executed in the case of using a volatile-shallow context, because the context was established in the PDN GW (For E-UTRAN step 7 and step 9, for GERAN/UTRAN step 7 and step 11).

In a step 7, a PCEF initiated IP-CAN Session Modification procedure is done. This operation does not have to be executed in the case of using a volatile-shallow context, because the context is already known to the PCRF and the PDN GW (For E-UTRAN step 8, for GERAN/UTRAN step 10).

In a step 8, the bearer/PDP context establishment is completed. This operation presumes a communication between the UE and the MME/SGSN and between the MME/SGSN and the S-GW. The communication part between the MME/SGSN and the S-GW does not have to be executed, because the context is already known in the S-GW (For E-UTRAN step 11 to 15, for GERAN/UTRAN step 13 to 15).

Instead, the following operations have to be executed for the volatile-shallow context activation in the critical handover time period:

On the first upload packet, the S-GW and the PDN-GW activate the volatile-shallow context, by this understanding that the PCC and QoS Rules and the Event Triggers are enforced and the mobility protocol is set to transmit data to the target access network.

Outside of the critical period of the handover, i.e. when the data traffic is already exchanged over the target access network, indications of the success of the handover may be transmitted to the PCRF and to the ANDSF.

This case presented may be especially beneficial, because no BBERF functionality is available in the ePDG, and therefore the PCRF may have to determine the QoS rules and event triggers before the end of the handover procedure.

When a volatile-shallow context may be established over the target 3GPP access network, no PCC or mobility protocol interactions may be necessary.

When a volatile-shallow context may be established over the target 3GPP access network, no bearer/PDP context establishment messages may be exchanged between network entities, i.e. MME/SGSN, S-GW and PDN GW.

The particular combinations of elements and features in the above detailed embodiments are exemplary only; the interchanging and substitution of these embodiments with other embodiments disclosed herein are also expressly contemplated. As those skilled in the art will recognize, variations, modifications, and other implementations of what is described herein can occur to those of ordinary skill in the art without departing from the spirit and the scope of the present disclosure as claimed. Accordingly, the foregoing description is by way of example only and is not intended as limiting. The invention's scope is defined in the following claims and the equivalents thereto. Furthermore, reference signs used in the description and claims do not limit the scope of the present disclosure as claimed.

The invention claimed is:

1. A system for managing an access network re-selection, the system comprising:
providing means for providing a first indication indicating a target access network to be re-selected in case of a handover event of a user entity from a current access network to the target access network, and for providing a second indication for establishing a certain context on the target access network,
establishing means for establishing the certain context on the target access network dependent on the provided second indication, said established context containing a first part of the access network re-selection, and
executing means for executing a second part of the access network re-selection due to the provided first indication and a received trigger for the handover.

2. The system of claim 1, wherein the first indication is embodied as a network decision indication including network re-selection policies to be executed by the execution means in case of the handover event of the user entity from the current access network to the target access network, wherein said certain context is embodied as a volatile-shallow context, said volatile-shallow context including information on identification of the user entity, in particular a user equipment or a mobile device.

3. The system of claim 1, wherein said certain context is embodied as a volatile-shallow context including information on the target access network for enabling a fast authentication of the user entity, in particular a user equipment or a mobile device, after reception of the trigger for the handover event.

4. The system of claim 1, wherein said certain context is embodied as a volatile-shallow context, said volatile-shallow context including information on active dataflows or possible active dataflows after reception of the trigger for the handover event of the user entity, in particular a user equipment or a mobile device, for enabling a faster policy-based resource reservation for the user entity after reception of the trigger for the handover event.

5. The system of claim 1, wherein the first indication is embodied as a network decision indication including network re-selection policies that the execution means have to execute in case of the handover event of the user entity from the current access network to the target access network, wherein said certain context is embodied as a volatile-shallow context, said volatile-shallow context including information on a physical layer, a link layer or a network layer for a following communication with the user entity.

6. The system of claim 1, wherein the certain context is embodied as a volatile-shallow context, said volatile-shallow context including information on a mobility model to be used after reception of said trigger for the handover event.

7. The system of claim 1, wherein said establishing means are configured to initiate pre-authentication procedures dependent on the second indication provided by said providing means.

8. The system of claim 1, wherein said establishing means are configured to initiate procedures for establishing a communication path through the target access network at least dependent on the second indication provided by said providing means.

9. The system of claim 1, wherein said establishing means are configured to initiate mobility protocol-related procedures for exchanging mobility-related information to certain other network entities, wherein said establishing means are particularly configured to initiate the mobility protocol-related procedures for preparing a new communication path on the target access network.

10. The system of claim 1, wherein said certain context is embodied as a volatile-shallow context, wherein, during an establishment of the volatile-shallow context, said establishing means are configured to initiate policy and charging rules for providing information on Quality of Service (QoS), rules to be provided by said establishing means.

11. The system of claim 1, wherein said establishing means are configured to reserve Quality of Service (QoS), reservations correspondent for said certain context depending on a probability of a handover event to the target access network.

12. The system of claim 1, wherein said first part of the access network re-selection executed by said established context on said target access network is executable without communicating with the executing means.

13. The system of claim 1, wherein the first indication is embodied as a network decision indication including network re-selection policies to be executed by the execution means in case of the handover event of the user entity from the current access network to the target access network, wherein said certain context is embodied as a volatile-shallow context, wherein said volatile-shallow context is activated by means of a first upload packet of the user entity or by means of a definite mechanism including an authentication procedure executed between the user entity and the target access network.

14. A method for managing an access network re-selection, the method comprising:
providing a first indication indicating a target access network to be re-selected in case of a handover event of a user entity from a current access network to the target access network and a second indication for establishing a certain context on the target access network,
establishing the certain context on the target access network dependent on the provided second indication, said established context containing a first part of the access network re-selection, and
executing a second part of the access network re-selection due to the provided first indication and a received trigger for the handover event.

15. A non-transitory computer readable medium storing computer program comprising a program code for executing the method of claim 14 when run on a computer.

* * * * *

UNITED STATES PATENT AND TRADEMARK OFFICE
CERTIFICATE OF CORRECTION

PATENT NO. : 8,787,318 B2  
APPLICATION NO. : 13/566628  
DATED : July 22, 2014  
INVENTOR(S) : Pampu Cornel et al.

Page 1 of 1

It is certified that error appears in the above-identified patent and that said Letters Patent is hereby corrected as shown below:

On the Title Page

Column 1, Item [75] (Inventors), Lines 1-2, Delete, "Zhou Qing", insert -- Qing Zhou --, therefore.

Signed and Sealed this
Twenty-fourth Day of February, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,787,318 B2 | |
| APPLICATION NO. | : 13/566628 | |
| DATED | : July 22, 2014 | |
| INVENTOR(S) | : Pampu Cornel et al. | |

It is certified that error appears in the above-identified patent and that said Letters Patent is hereby corrected as shown below:

On the Title Page, Item [73] (Assignee), Line 5:

delete "Munuch" and insert --Munich--, therefor.

Signed and Sealed this
Seventh Day of July, 2015

Michelle K. Lee
*Director of the United States Patent and Trademark Office*